(12) United States Patent
Marks

(10) Patent No.: US 6,357,251 B1
(45) Date of Patent: Mar. 19, 2002

(54) PERSONAL TABLETOP AIR COOLER

(75) Inventor: Joel Marks, Sherman Oaks, CA (US)

(73) Assignee: WorkTools, Inc., Chatsworth, CA (US)

( * ) Notice: Subject to any disclaimer, the term of this patent is extended or adjusted under 35 U.S.C. 154(b) by 0 days.

(21) Appl. No.: 09/563,367

(22) Filed: May 3, 2000

(51) Int. Cl.[7] ................................................. F25D 3/02
(52) U.S. Cl. .............................. 62/425; 62/420; 62/530; 62/406
(58) Field of Search .......................... 62/420, 425, 530, 62/406

(56) References Cited

U.S. PATENT DOCUMENTS

| | | | |
|---|---|---|---|
| 3,140,590 A | | 7/1964 | Gleockler |
| 4,612,774 A | * | 9/1986 | Budreau ........................ 62/59 |
| 4,854,374 A | * | 8/1989 | Harrison ...................... 165/47 |
| 4,860,556 A | * | 8/1989 | Hammett ..................... 62/406 |
| 5,046,329 A | * | 9/1991 | Travis, III ................. 62/259.3 |
| 5,062,281 A | | 11/1991 | Oliphant et al. |
| 5,159,819 A | | 11/1992 | Wong |
| 5,197,301 A | | 3/1993 | Holcomb |
| 5,737,938 A | | 4/1998 | Liu |
| 5,953,933 A | * | 9/1999 | Cheng ......................... 62/425 |
| 6,192,702 B1 | * | 2/2001 | Shimogori ................. 62/259.3 |

* cited by examiner

Primary Examiner—William Doerrler
Assistant Examiner—Mark Shulman
(74) Attorney, Agent, or Firm—Brad I Golstein

(57) ABSTRACT

A portable cooling device includes an elongated chamber supported on a surface at an angle. The preferably cylindrical chamber holds a cylindrical bottle where an annular air space surrounds the bottle. The high efficiency design provides for adjusting the air direction with a one-piece pivotable outlet vent. A clamshell chamber made from two half-tubes allows easy plastic molding and access to the chamber interior for cleaning and for removal of the condensate tray. The integrated monolithic shape of the device fully encloses the working parts for a clean sanitary look.

19 Claims, 3 Drawing Sheets

PERSONAL TABLETOP AIR COOLER

BACKGROUND OF THE INVENTION

The present invention is a device which uses a fan to force air over a cold object to cool the air for personal comfort. Various related devices have been developed.

U.S. Pat. No. 5,046,329, issued to Travis, shows in one embodiment a device using multiple chambers containing a frozen gel. In a second embodiment an elongated hollow cylinder contains a cold cylinder. Air can pass through an annular space around the cold object under the force of a fan. The cold object is a freezable jar containing a material such as water. Thin corrugated aluminum baffles are proposed to enhance heat transfer. The fan assembly is under the cylinder.

U.S. Pat. No. 5,737,938, issued to Liu, shows a portable air conditioning unit including multiple separate frozen or cold cooling elements. The device housing rotates on a stand to adjust the air direction. A condensate pan rests on the base of the stand, connected to the unit by a flexible tube. A heavy bearing and lock bolt hold the housing in an angular position.

U.S. Pat. No. 5,062,281, issued to Oliphant et al., shows a motorized cap that fits atop a cup of cold liquid such as an iced drink. The cap is a cylindrical housing that contains batteries and a fan. The fan blows air across the top of the cool liquid and out the top of the cap. The user may drink the liquid through a spout in the same cap. The moving air comes in direct contact with the liquid.

U.S. Pat. No. 5,159,819, issued to Wong, shows a housing containing batteries, a fan, an air inlet, an air outlet, an ice cube chamber, and an ice melt accumulation area. The air enters the inlet, passes through the ice cubes, and exits the outlet. Outlet slats are individually rotatable.

U.S. Pat. No. 5,197,301, issued to Holcomb, shows a box shaped device including an inner box containing frozen material such as ice, an outer box, and a space between the boxes below and beside the inner box. Air passes below, and then beside the inner box in a duct formed by the two boxes. Air does not directly contact the ice. Drain valves are provided for melted ice and condensate.

U.S. Pat. No. 3,140,590, issued to Gleockler, shows a gas mask like device, where the user draws cool air into the mask through canisters containing ice cubes.

The prior art do not disclose an effective solution for a tabletop personal air cooler. No simple, low cost methods to adjust the airflow direction are shown.

Many prior devices pass air over ice or liquid. These methods will add moisture to the air, which is not desirable for air-cooling. Other devices use coolant within a container. While this will prevent additional moisture in the air stream, condensate will form on the outer surface of the container. This condensate must be stored and/or removed. U.S. Pat. No. 5737938 shows a way to store condensate in a pan outside of the device. The pan is necessarily separate from the main element of the device because the device must rotate to adjust the angle of the outlet air. A self-contained pan would spill its contents if it were within a rotating housing. Further the airflow must not be aimed horizontally or lower since the condensate could not flow out of the housing.

The prior art further do not disclose a unit wherein the interior of the unit can be easily accessed to change cooling elements and to clean the interior. The ability to clean mildew and the like is important when moisture is present within any device.

SUMMARY OF THE INVENTION

The present invention includes a housing with an angled, elongated preferably cylindrical air chamber with a fan at the bottom rear, a pivotable outlet grill at the top, and a bottle holding a cold substance such as ice within the cylinder. Moving air is cooled as it passes lengthwise in a space between the bottle exterior and the chamber interior. The ice is separated from the air by the bottle so the air stays relatively dry.

The device of the invention preferably uses bottles containing a freezable liquid, typically water. Two types of bottles may be used. A first specialized bottle can have a mouth that is wide enough to fit common ice cubes. The specialized bottle is preferably the same size as a standard plastic water beverage bottle, except for an enlarged neck and cap area. Either style can work well for the device. In this manner several standard bottles can be frozen in a freezer so that one is always ready for use. But if a freezer is not available to freeze entire bottles, ice may be added to the special bottle. The special bottle allows the cooling device to be used wherever ice is available. However other types of cold objects may be used. For example an electric powered thermoelectric element using the Peltier effect may be used instead of frozen objects.

The present invention is optimized for efficient airflow while still providing an easy way to change the direction of the discharge air. Suited for tabletop use, the device allows the airflow to follow a relatively unbroken path toward the user. The bottle is coaxial within the cylindrical housing, forming an elongated tubular space surrounding the exterior of the bottle, through which the air can flow. The housing provides a generally fixed direction for the airflow, while adjustments to the airflow direction can be made with a rotatable vent grill at the outlet end. The vent grill is supported and held to a position with lightweight components.

The cooling device is optimized to facilitate flow and storage of condensate. Since the air chamber is fixed at an angle the condensate will flow quickly along the bottom of the chamber and into a collection tray. The tray can be entirely enclosed within the housing for a sanitary, integrated and pleasing appearance.

The cooling device includes a base portion and a top portion, with the base being under the bottle and the top being above the bottle. To provide for opening the chamber, the top is separable from the base. In a preferred embodiment the chamber opens in a clamshell manner whereby the top is pivotally attached to the base. Alternately it may be entirely removable from the base. In either case the interior of the chamber is fully exposed and accessible when the chamber is open. The cooling bottle can easily be removed and exchanged for a fresh one. With the bottle removed the chamber interior can be easily cleaned since the surfaces are well exposed. Since the bottle is a simple cylindrical or similar shape it is also easy to clean.

DETAILED DESCRIPTION OF THE INVENTION

Figure 1:
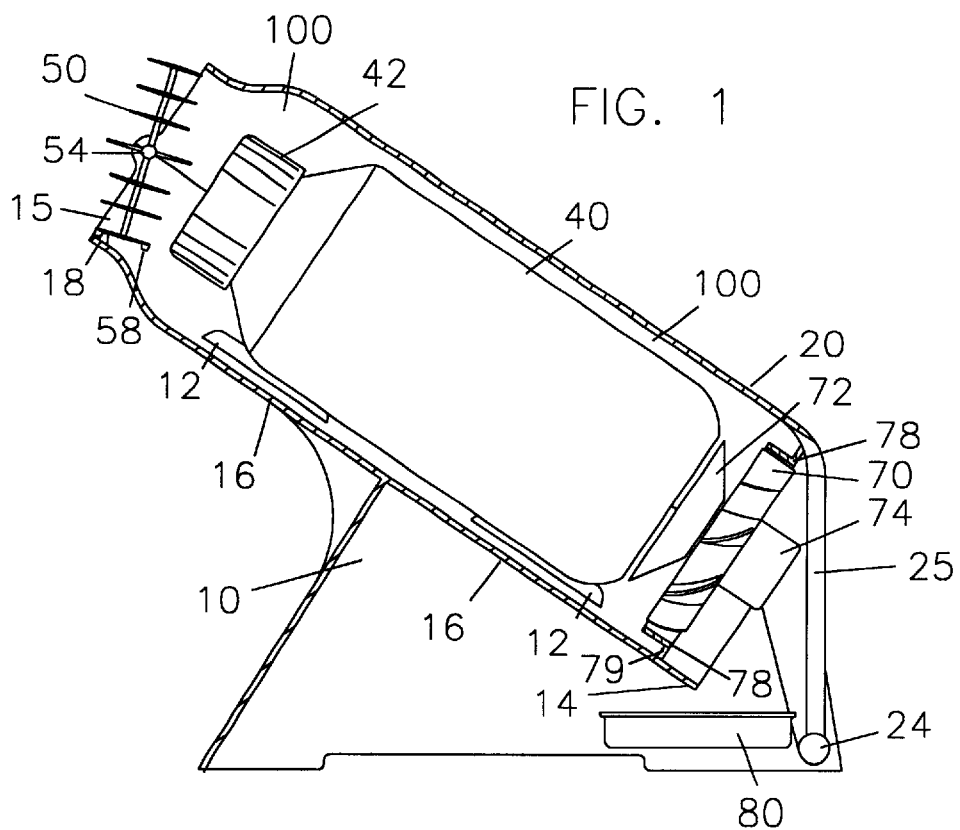
FIG. 1 is side elevation of a cooling device, partly in section, showing internal components.
Figure 2:
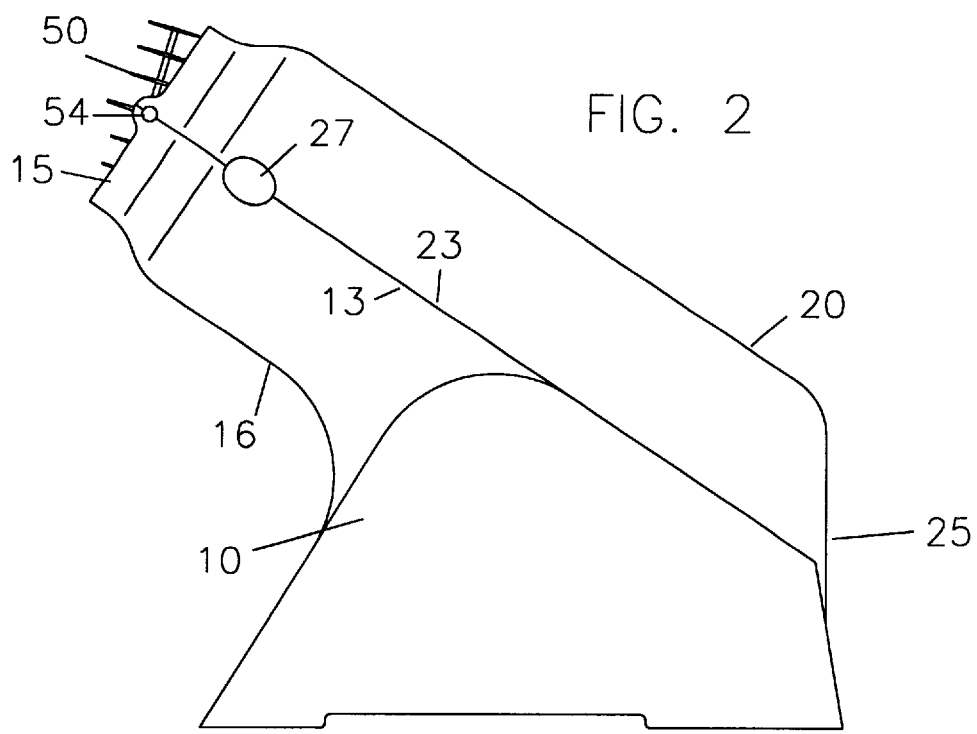
FIG. 2 is the cooling device of FIG. 1, showing a pivotable vent at the top end
Figure 6:
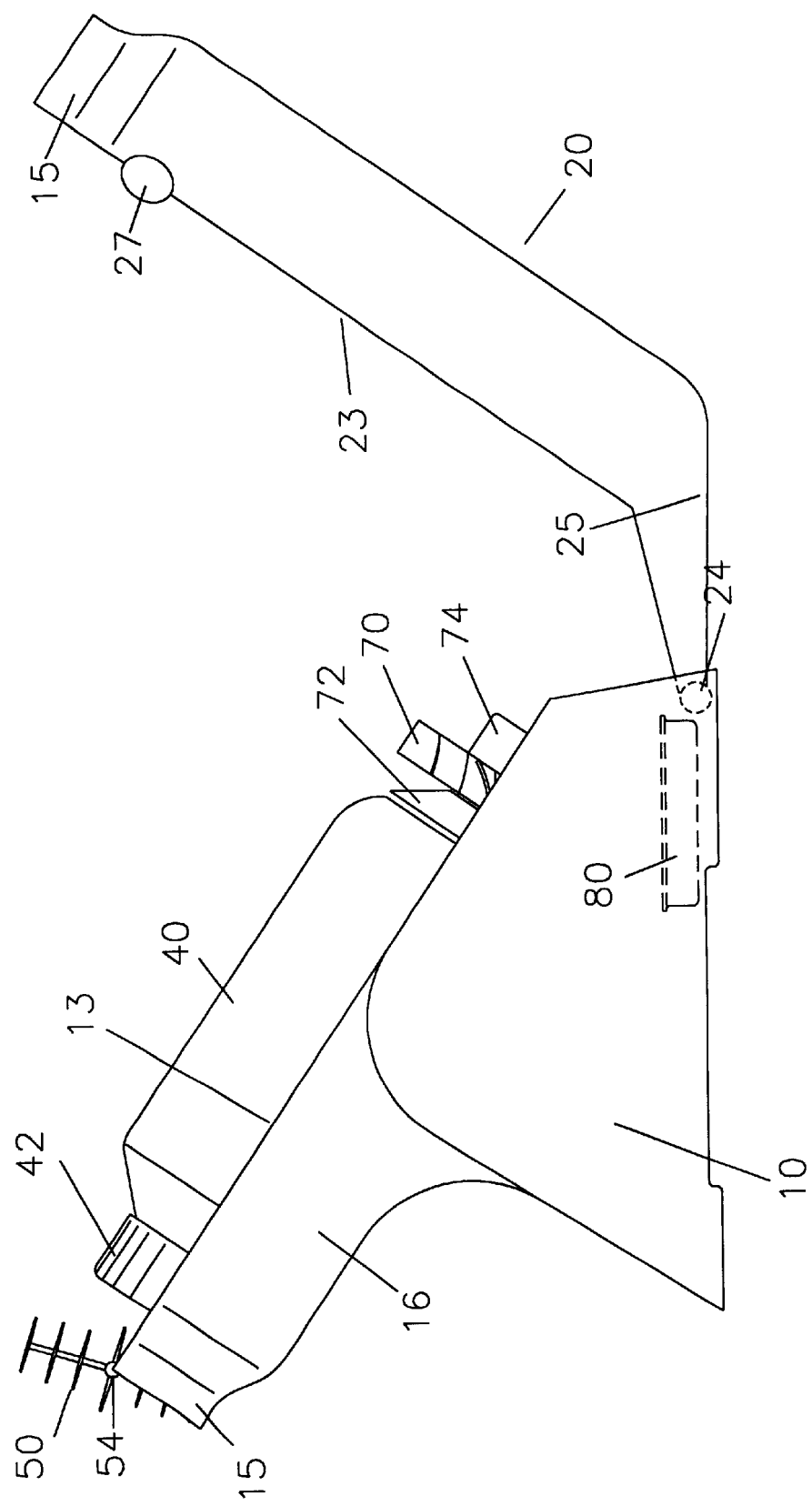
FIG. 6 is the cooling device of FIG. 1, with the cover opened to expose the interior.

In FIG. 1 the elements of the invention are shown. A housing includes a base 10 and a cover 20. Base 10 includes a supporting structure to hold the working portion of the device at a fixed angle. A tubular underside 16 is part of base 10 and surrounds the bottom of bottle 40, forming the lower part or half-tube of chamber 100. FIG. 1 shows the full length of underside 16. Cover 20 defines the upper part or half-tube of chamber 100. FIG. 6 shows base 10 and cover 20 separated. Base 10 may include small screws, jacks, or spacers, not shown, to slightly change the position or angle of the cooling device. However according to the invention the angle of chamber 100 is largely fixed relative to a supporting surface such as a tabletop.

The direction of the air stream is primarily adjusted by steering or moving vent 50 within air outlet 15. In the illustrated embodiment rotating vent 50 about pivots 54 changes the position of vent 50. The vent may be movable so that the air stream is aimed below horizontal or nearly straight up. Especially with the larger size bottle cap 42, adequate clearance between the rear of vent 50 and cap 42 behind it must be provided to allow pivoting of vent 50. At the extreme positions of vent 50 some loss in airflow efficiency may be expected. Pivots 54 are a lightweight support structure defining a rotation axis across a width of vent 50, FIG. 4. Pivots 54 are supported in cavities or openings of the housing. Or, in reverse, a pivot member of the housing may engage an opening or cavity in vent 50. Alternately the slats comprising vent 50 may individually rotate about relatively fixed positions within outlet 15. Such an alternate structure would require movable links to multiple element slats, or each multiple slat to be moved individually as in U.S. Pat. No. 5,159,819. Therefore the single element vent 50 as shown will be a simpler structure. Since chamber 100 is angled near 45° the air stream will usually not require a large change in direction to satisfy a user employing the device on a tabletop.

Vent 50 engages one or more stops 58 of the vent with one or more stops 18 of base 10 to limit the motion of vent 50. Preferably both stop directions are part of the function of base 10. If a stop functions as part of cover 20 it would not work when cover 20 is opened. Vent 50 could accidentally be moved out of position when cover 20 is opened. Similarly a method to hold vent 50 to base 10 independently from cover 20 should be provided. For example pivot 54 may be entirely surrounded by material of base 10 rather than only by bottom semicircular recess of base 10 as shown in FIG. 1. In manufacture, the walls of base 10 at outlet 15 could be spread apart to securely retain vent 50 to base 10 if base 10 fully surrounds pivots 54. Vent 50 should include a friction or detent engagement with the housing to hold a position. Since vent 50 is lightweight, a small amount of friction will serve to hold a position. The friction may be between the engagement of pivots 54 and the respective cavities in the housing, wherein a resilient interference fit creates the desired friction.

Chamber 100 forms a relatively thin annular shape around bottle 40 defined by the spacing between bottle 40 and the interior of chamber 100. The airflow induced by fan 70 will be fast in this area since bottle 40 creates a constriction in chamber 100. To maintain the speed of air exiting the device, outlet 15 is reduced in area to form a constricted nozzle. Outlet 15 does not substantially change the air flow direction. The upper front end of chamber 100 approximately follows the shape of the upper end of bottle 40, with allowance to fit both small neck and large neck bottles. This is seen in the Figures. Bezel or cone 72 is fitted between fan 70 and the bottom of bottle 40. Further bottle 40 preferably has a rounded bottom end. The rounded bottle combined with cone 72 smoothes airflow around bottle. Cone 72 expands toward bottle 40 and is very near to bottle 40, possible supporting the bottle. Shroud 78, FIGS. 1 and 4, preferably surrounds fan 70 to increase the efficiency of fan 70. Opening 79 in shroud 78 allows for condensate water to flow under the fan and into tray 80. If the fan is large enough in diameter the interior of chamber 100 may serve as the shroud. The fan is preferably at the inlet end of the device behind bottle 40, although it can function as well at the outlet side in front of bottle 40, for example just behind vent 50.

In FIG. 1, specialized bottle 40 is shown with cap 42 fitted. In the preferred embodiment the specialized bottle has an opening approximately one half the diameter of the main body of the bottle, while the bottle is about ¾ to 1.5 liter in size. Then ice cubes can be quickly added to the bottle.

Other standard bottles with smaller caps and openings may also fit within chamber 100, but they must be frozen as a unit since ice cubes cannot easily be added. In this case a few such bottles can keep the cooling device operating continuously. For example if one bottle lasts 2 hours, and requires 6 hours to freeze, then four bottles will provide continuous operation. A solidly frozen bottle will last longer than an ice cube filled one since the density of ice is greater when solid. But an ability to use ice cubes is desirable if a freezer or drink bottles are not available while ice cubes are. Electrically powered devices may also serve as a cold object within chamber 100.

Tray 80 fits in a substantially fixed position below underside 16, immediately below lowest end 14 of underside 16. Tray 80 may easily be removed from the cooling device when cover 20 is opened as in FIG. 6. However when cover 20 is closed tray 80 is largely hidden from view, and securely held in position. A user may choose to keep tray 80 in place and tilt the entire device to empty tray 80. Underside lower end 14 is always in the same position above tray 80, independent of how the air stream is aimed.

In FIG. 6 it is clear that bottle 40 is very accessible so that a fresh bottle can be installed. Fresh ice can be added to the bottle if the bottleneck or opening is large enough. When bottle 40 is removed the interior of chamber 100 is widely exposed for easy cleaning, both the cover and underside portions. Preferably tray 80 is designed to hold enough water to last at least as long as one bottle so that tray 80 may be emptied at the same time as the bottle 40 is changed.

In the illustrated embodiment cover 20 is separable from base 10 by rotating about hinge or pivot 24. Alternately cover 20 may pivot or hinge about other locations. The hinge may be along an edge such as between edges 13 and 23. Or the hinge may be at the front of the device such as near vent 50. In this case pivot 24 and 54 could be the same location. Or cover 20 may be simply removable from base 10, where it is held in position by friction, snaps or other methods. In the preferred embodiment cover 20 hinges near the rear of base 10 as shown so that cover 20 does not interfere when open while it is easy to reclose. Inlet grill 25 is preferably molded as part of cover 20. Grill 25 guards fan 70 and provides a structural function to tie pivot 24 to the body of cover 20. This is best seen in FIG. 6. Grill 25 is moved away from fan 70 when cover 20 is open to ease cleaning of the fan and as discussed, to ease removal of tray 80. The top rear corner of cover 20 may contact a support surface such as a tabletop to hold cover 20 in a partially vertical position when fully opened. This corner of cover 20 is the lower right corner in FIG. 6. No internal stops within the device are required. Cover 20 remains easy to grab and reclose. Cover 20 could be further opened if the device is lifted off the surface if no internal stops are used.

Figure 5:
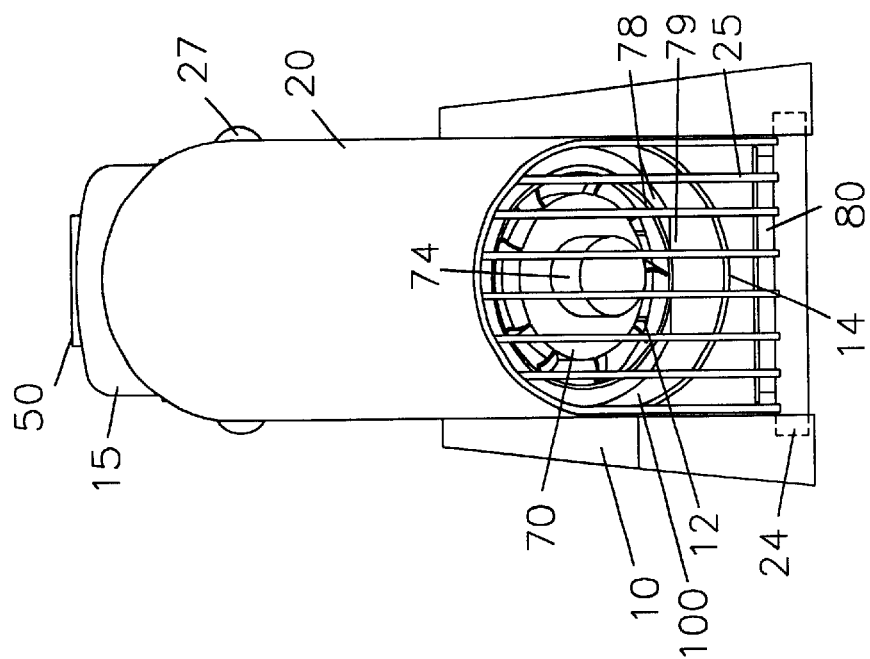
FIG. 5 is a rear elevation of the cooling device of FIG. 1.

Latch 27 is fitted near the front of the housing to latch cover 20 to base 10. Latches 27 may be a symmetrically positioned pair as in FIG. 4 and 5. Further latches 27 may be pushbuttons and be permanently attached to cover 20 while releasably engaging base 10. Then with one hand a user can easily squeeze the two buttons 27 together and pull cover 20 open, where buttons 27 are resiliently movable relative to base 10.

Figure 4:
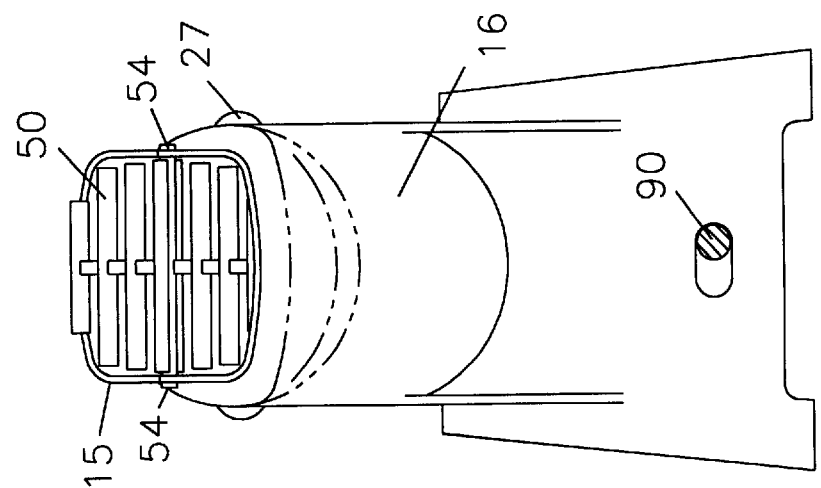
FIG. 4 is a front elevation of the cooling device of FIG. 1.
Figure 3:
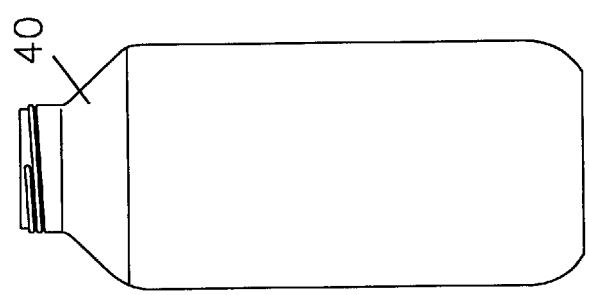
FIG. 3 is a specialized wide mouth bottle without a cap attached.

Motor 74 powers fan 70. Motor 74 may extend into the enclosure formed by cone 72. Preferably motor 74 is provided an at least partial enclosure to protect it from direct exposure to the moisture on the surface of bottle 40. Motor 40 is preferably supplied with a low voltage power source. The power source may include a built-in battery, or an AC adapter. A 12-volt or other vehicle power supply may be used. A household voltage power source may be used if the system is properly insulated. The support structure of base 10 provides adequate interior space to fit "D" cell or other batteries, not shown. In FIG. 4 on/off switch 90 is shown. Switch 90 is conveniently accessible, facing a user, under the cantilevered portion of chamber 100. Base 10 may extend further forward under chamber 100 if desired. Base 10 and half-tube underside 16 are preferably molded as one piece.

When cover 20 is closed against base 10, respective edges 23 and 13 are substantially touching each other to form a reasonable seal for chamber 100. A tongue and groove engagement at edges 13 and 23 may be used. However since the air pressure is low in chamber 100 for a personal cooler device, a very tight seal is not needed to guide the airflow.

Since chamber 100 is substantially cylindrical in a preferred embodiment a consistent spacing is maintained around a common cylindrical bottle. Other cross sectional shapes may be used for chamber 100, such as triangular, square, star, or others. But the closer to circular the sectional shape of chamber 100 is the better it well fit standard bottles. Spacer ribs 12 hold bottle 40 a predetermined distance away from underside 16 to allow airflow under bottle 40. Spacer ribs 12 extend from the interior of underside 16 and are elongated longitudinally within chamber 100 to provide a substantial rib structure while minimally affecting airflow. Ribs are not required on top of bottle 40 since the weight of bottle 40 will hold it in place. However if the device is expected to be moved around often, top ribs attached to cover 20 may provide a benefit to hold bottle 40 in position.

According to one feature of the invention the joint line defined by edges 13 and 23 extends nearly centrally along the length of chamber 100. This clamshell design allows two half-tubes to be fitted together to form cylindrical chamber 100. These two half-tubes or other partially enclosing shape can easily be molded with ordinary plastic forming methods. No undercuts or mold slides are needed to form the basic shape of chamber 100. Further the rounded shape provides a neat clean appearance. Any separable top and bottom elements that both include a recess to partially surround a bottle will provide a benefit according to the invention. The chamber need not be specifically cylindrical.

According to the invention a simple angled chamber provides smooth, relatively laminar airflow through an annular chamber space. This provides efficiencies like a jet engine where a fan moves air around a core. The efficient low speed air flow of the cooling device allows quiet operation. A single monolithic housing contains all the elements of the cooling device. A small vent is steerable to change the outlet air direction. This is preferable to moving the entire cooling chamber to change air direction since moving the entire chamber requires more effort and support structure and importantly, is disruptive to other nearby objects on a table top. The vent is able to be small and simple because it is at the narrow discharge end of an elongated tubular chamber. Because it is small it is practical to use a single pivot location, pivot 54, to steer the vent. A larger vent would be clumsy to adjust this way. The large vent that is typical of some other designs must use the multilinked slats discussed earlier to change air direction.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims following.

What is claimed is:

1. A portable cooling device comprising:
an elongated, tubular chamber with provision for a cold object within the chamber, the chamber supported by a base at a substantially fixed chamber angle, the angle being approximately central between horizontal and vertical;
a fan to force air into an inlet end of the chamber and out of an outlet end of the chamber, the outlet end including a steerable vent to change the direction of air flowing out of the cooling device, the vent comprising substantially a single separate element of the cooling device including a plurality of spaced and substantially parallel vent slats, the vent being rotatable about a single axis of rotation between a lower vent position and an upper vent position, a bottom vent slat rotating about the single axis toward the inlet end of the chamber when the vent is rotated toward the lower position;
a support structure comprising at least two distinct pivot members defining the single rotation axis across a width of the vent.

2. The portable cooling device of claim 1 wherein the vent is supported at the outlet end of the chamber by pivot members of the vent, and the pivot members engage the chamber with frictional resistance against rotation of the vent.

3. The portable cooling device of claim 1 wherein the chamber is substantially cylindrical, and the cold object is a substantially cylindrical elongated bottle which fits within the chamber, the bottle is smaller in transverse cross section than an interior of the chamber to provide an annular space around the bottle, and the fan forces air around the bottle within the chamber through the annular space.

4. The portable cooling device of claim 3 wherein the chamber includes a transverse cross sectional area where a main body of the bottle is positioned, and a cross sectional area of the outlet end is less than the chamber cross sectional area.

5. The portable cooling device of claim 4 wherein the chamber approximately follows the shape of a bottle upper end.

6. The portable cooling device of claim 3 wherein the fan is behind the bottle, and a cone is positioned between the fan and the bottle, with a cone large end adjacent to the bottle.

7. The portable cooling device of claim 6 wherein the bottle has a rounded edge adjacent to the cone.

8. The portable cooling device of claim 6 wherein the cone supports the bottle within the chamber.

9. A portable cooling device comprising:
- an elongated, tubular chamber with provision for a cold object within the chamber, the chamber supported by a base at a substantially fixed chamber angle, the angle being approximately central between horizontal and vertical;
- a fan to force air into an inlet end of the chamber and out of an outlet end of the chamber, the outlet end including a steerable vent to change the direction of air flowing out of the cooling device, the vent comprising substantially a single element and being rotatable about a single axis of rotation;
- a condensate accumulation tray positioned near the inlet end of the chamber a fixed distance below the chamber.

10. A portable cooling device comprising:
- an elongated, tubular chamber with provision for a cold object within the chamber, the chamber supported by a base at a substantially fixed chamber angle, the angle being approximately central between horizontal and vertical;
- a fan to force air into an inlet end of the chamber and out of an outlet end of the chamber, the outlet end including a steerable vent to change the direction of air flowing out of the cooling device, the vent comprising substantially a single element and being rotatable about a single axis of rotation;
- the chamber is substantially cylindrical, and the cold object is a substantially cylindrical elongated bottle which fits within the chamber, the bottle is smaller in transverse cross section than an interior of the chamber to provide an annular space around the bottle, and the fan forces air around the bottle within the chamber through the annular space;
- the bottle including an opening approximately one-half the diameter of a main body of the bottle.

11. A portable cooling device comprising:
- an underside half-tube and a cover half-tube that, when joined at edges, form an elongated tubular chamber, the chamber including provision for a cold object within the chamber; the respective half-tubes being separable from each other;
- a fan to force air into an inlet end of the chamber and out of an outlet end of the chamber;
- the respective half-tubes being pivotally attached together at a hinge.

12. The portable cooling device of claim 11 wherein the chamber is substantially cylindrical.

13. The portable cooling device of claim 11 wherein the hinge is located at a bottom, rear end of the cooling device.

14. The portable cooling device of claim 13 wherein the hinge is tied to the cover half-tube by an inlet grill structure.

15. The portable cooling device of claim 13 wherein the cover half-tube, when opened, contacts a supporting surface under the cooling device to hold the cover in an open position.

16. The portable cooling device of claim 11 wherein the cold object is an elongated bottle, and the underside half-tube includes spacer ribs to support the bottle and position the bottle away from an interior of the underside half-tube.

17. The portable cooling device of claim 16 wherein the bottle is positioned within the chamber such that an annular air space surrounds the bottle.

18. The portable cooling device of claim 16 wherein the spacer ribs are elongated in a direction of a length of the chamber.

19. The portable cooling device of claim 11 wherein the respective half-tubes are releasably secured together by latches, and the latches comprise pushbuttons on opposite sides of the chamber near the outlet end of the chamber.

* * * * *